UNITED STATES PATENT OFFICE.

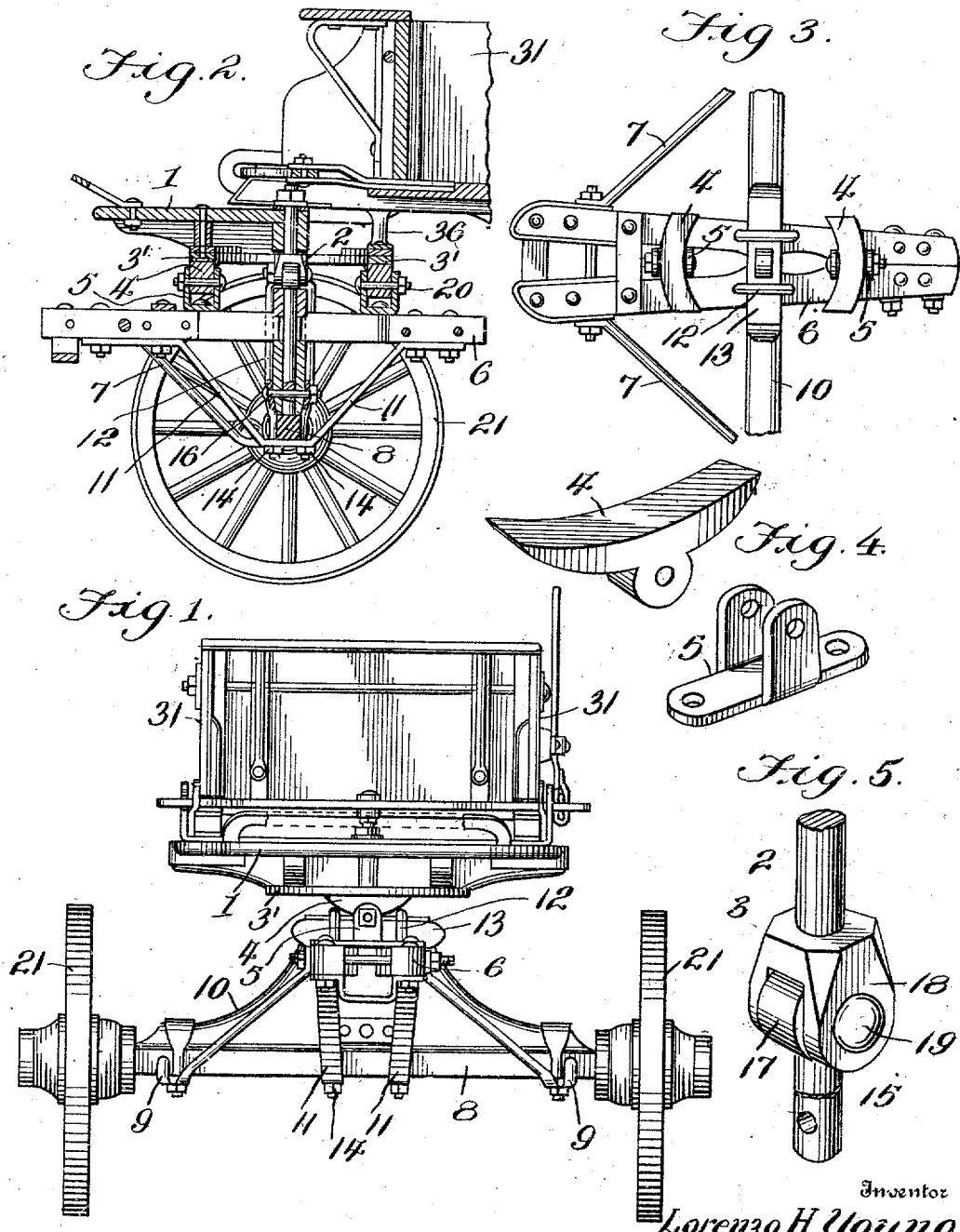

LORENZO H. YOUNG, OF HAGERSTOWN, MARYLAND, ASSIGNOR OF ONE-HALF TO V. P. HILL, OF HAGERSTOWN, MARYLAND.

FIFTH-WHEEL FOR DUMP-WAGONS.

959,414. Specification of Letters Patent. Patented May 24, 1910.

Application filed October 16, 1908. Serial No. 458,050.

*To all whom it may concern:*

Be it known that I, LORENZO H. YOUNG, a citizen of the United States, residing at Hagerstown, in the county of Washington and State of Maryland, have invented new and useful Improvements in Fifth-Wheels for Dump-Wagons, of which the following is a specification.

This invention relates to improvements in fifth wheels for dump wagons, and the primary object of the invention is to provide a wagon of this character with a king bolt constructed of a pair of members, one of the members being secured to the front platform of the wagon, while the other member is connected with the hound of the front wheels, the platform of the wagon being provided with an endless fifth wheel, while the hound is provided with pivoted shoes adapted to engage the fifth wheel so that the front wheels of the device may be free to tilt when striking a gully or the like without tilting the body of the wagon.

With these objects in view the invention resides in the novel construction and arrangement of parts hereinafter fully described and claimed.

In the accompanying drawing, forming a part of this specification, Figure 1 is a front elevation of a dump wagon provided with my improvement. Fig. 2 is a partial longitudinal sectional view taken through the forward part of the wagon. Fig. 3 is a partial plan view of the hound and front axle connected therewith. Fig. 4 is a perspective view of one of the shoes and the support therefor, the parts being shown separated. Fig. 5 is a detail perspective view of the sectional king bolt.

In the accompanying drawings the numeral 1 designates the front platform of the wagon. This platform is adapted to project a suitable distance beyond the body of the wagon and is provided with an upper section 2 of the king bolt 3. Secured to the under face of the platform 5 is a fifth wheel 3' of the wagon. This wheel 3' comprises a flattened angular member or ring and is adapted to be contacted by a pair of oppositely disposed shoes 4, pivotally mounted in suitable supports 5, secured to the hound of the wagon. The hound 6 is constructed of a pair of members suitably spread apart at their outer ends to provide for the reception of the tongue, not shown. The outer ends of the members comprising the hounds 6 are provided with suitable downwardly extending brace rods 7, which have their lower ends connected by suitable plates to the outer end of the front axle 8. These brace rods 7 are also provided with eyes or hooks 9 projecting from their points of connection with the front axle 8, and adapted to serve as a means whereby swingle or double trees may be attached, if desired. Positioned between the hound 6 and the front axle 8 is a bolster 10. The hound 6 is provided with intermediate bracing members 11 adapted to be secured to the front and rear portion of the said hound and to extend at an angle toward and beneath the axle 8. The brace members 11 are provided, adjacent their points of contact with the axle 8, with spaced perforations, the same being adapted for the reception of the rounded extremity of the yoke members 12, which are positioned upon a cross bar 13 carried by the hound 6, and which project downwardly from each side of the bolster 10 and have their free ends provided with retaining elements 14, through the medium of which the bolster hound and axle are securely positioned in proper relation with each other.

Extending upwardly through the bolster and the cross bar 13 is a lower member of the king bolt 3. This lower member 15 has its lower end provided with a suitable perforation, which is adapted for the reception of the retaining element 16, through the medium of which the bolt is securely retained within the opening provided by the cross bar 13 and the bolster 10. The member 15 is further provided with a head 17 having a suitable opening which is positioned just above the upper face of the bar 13. The head 17 is adapted to engage the bifurcated head 18 provided upon the upper section 2 of the king bolt 3. The members 18 of the bifurcated head have suitable openings adapted to aline with the opening in the head 17, and the members 2 and 15 are hingedly secured together through the medium of the bolt or pintle 19. The shoe supports 5 are each provided with a pair of spaced upwardly extending arms having suitable alining openings, and the shoes 4 are provided with downwardly extending portions each being provided with an opening adapted to aline with the openings provided in the support and these openings are adapted for the reception of a suitable pintle 20, by which the shoe and support are hingedly connected together.

It will be noted by reference to Fig. 4 of the drawings that the body of the shoes 4 are of an arcuate formation to correspond with the annular ring of the 5th wheel 3', and that by the construction and arrangement of parts described, the front wheels 21 of the wagon may be tilted in either direction without interfering with the horizontal plane of the wagon body 31. The body 31 may be further supported, if desired, through the medium of a downwardly extending member 36 which engages the inner portion of the fifth wheel 3 as clearly illustrated in Fig. 2 of the drawings.

Having thus fully described the invention what is claimed as new is:

In a dump wagon having a front platform mounted on the frame thereof, a flat cylindrical ring beneath the platform and connected therewith, a hound, U-shaped members upon the hound arranged diametrically opposite each other and disposed normally longitudinal of the center of the wagon frame, curved shoes pivotally connected between the arms of the U-shaped member and bearing upon the ring, a bolster connected with the hound, an axle upon the bolster, bracing members for the axle and hound, yoke members positioned upon each side of the bolster and engaging the said brace members adjacent each side of the axle, a king bolt, said king bolt comprising a pair of members, the lower member being connected with the bolster and being provided with an enlarged perforated head, the second member of the king bolt being connected with the platform and being provided with a bifurcated head having openings adapted to aline with the opening within the head of the first section and a removable bolt for these openings, substantially as and for the purpose set forth.

In testimony whereof I affix my signature in presence of two witnesses.

LORENZO H. YOUNG.

Witnesses:
REINHOLD J. HALM,
G. C. ANDERSON.